(12) United States Patent
Schulz et al.

(10) Patent No.: US 7,678,443 B2
(45) Date of Patent: *Mar. 16, 2010

(54) COMPLEX MICROSTRUCTURE FILM (75) Inventors: Mark F. Schulz, Lake Elmo, MN (US);
Paul D. Graham, Woodbury, MN (US);
Thomas P. Hanschen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/483,873

(22) PCT Filed: May 16, 2003

(86) PCT No.: PCT/US03/15480

§ 371 (c)(1), (2), (4) Date: Jan. 14, 2004

(87) PCT Pub. No.: WO04/000568

PCT Pub. Date: Dec. 31, 2003

(65) Prior Publication Data

US 2004/0229014 A1 Nov. 18, 2004

(51) Int. Cl.
- B32B 3/00 (2006.01)
- B32B 3/30 (2006.01)
- B32B 3/28 (2006.01)
- B32B 7/12 (2006.01)
- B32B 15/04 (2006.01)
- B32B 9/00 (2006.01)
- B32B 33/00 (2006.01)

(52) U.S. Cl. ............ 428/172; 428/156; 428/166; 428/180; 428/40.1; 428/343; 428/354

(58) Field of Classification Search ........... 428/141, 428/156, 167, 172, 166, 343, 354, 40.1, 180
See application file for complete search history.

(56) References Cited

U.S. PATENT DOCUMENTS

| | | | |
|---|---|---|---|
| 3,331,729 | A | 7/1967 | Danielson et al. |
| 3,558,290 | A | 1/1971 | Baier et al. |
| 4,397,905 | A | 8/1983 | Dettmer et al. |
| 4,500,631 | A | 2/1985 | Sakamoto et al. |
| 4,761,320 | A | 8/1988 | Coburn, Jr. |
| 4,781,957 | A | 11/1988 | Brown et al. |
| 4,894,060 | A | 1/1990 | Nestegard |
| 5,141,790 | A | 8/1992 | Calhoun et al. |
| 5,253,409 | A | 10/1993 | Bier et al. |
| 5,273,805 | A | 12/1993 | Calhoun et al. |

(Continued)

FOREIGN PATENT DOCUMENTS

EP 0 854 051 B1 4/2001

(Continued)

*Primary Examiner*—David R Sample
*Assistant Examiner*—Catherine Simone
(74) *Attorney, Agent, or Firm*—Philip P. Soo (57) ABSTRACT

The present invention is directed to an adhesive article and methods of manufacturing the adhesive article. The adhesive article comprising at least one major surface comprising a microstructured surface, the microstructured surface comprising microstructured elements, the microstructured elements comprising walls and at least one wall has variable height with a maximum height and a minimum height along the wall length.

6 Claims, 2 Drawing Sheets

U.S. PATENT DOCUMENTS

| | | | |
|---|---|---|---|
| 5,300,263 | A | 4/1994 | Hoopman et al. |
| 5,342,688 | A | 8/1994 | Kitchin et al. |
| 5,344,681 | A | 9/1994 | Calhoun et al. |
| 5,354,813 | A | 10/1994 | Farooq et al. |
| 5,435,247 | A | 7/1995 | Giori et al. |
| 5,449,540 | A | 9/1995 | Calhoun et al. |
| 5,450,235 | A | 9/1995 | Smith et al. |
| 5,589,269 | A | 12/1996 | Ali et al. |
| 5,650,215 | A * | 7/1997 | Mazurek et al. .............. 428/156 |
| 5,679,302 | A | 10/1997 | Miller et al. |
| 5,712,027 | A | 1/1998 | Ali et al. |
| 5,728,446 | A | 3/1998 | Johnston et al. |
| 5,897,930 | A | 4/1999 | Calhoun et al. |
| 6,129,964 | A | 10/2000 | Seth |
| 6,197,397 | B1 | 3/2001 | Sher et al. |
| 6,203,885 | B1 | 3/2001 | Sher et al. |
| 6,274,213 | B1 | 8/2001 | Kawashima |
| 6,299,956 | B1 | 10/2001 | Freedman |
| 6,386,699 | B1 | 5/2002 | Ylitalo et al. |
| 6,531,206 | B2 | 3/2003 | Johnston et al. |
| 2001/0023014 | A1 | 9/2001 | Patel et al. |
| 2001/0031342 | A1 | 10/2001 | Engle et al. |
| 2002/0187294 | A1 | 12/2002 | Zhou et al. |
| 2003/0129343 | A1 | 7/2003 | Galkiewicz et al. |
| 2003/0184636 | A1 | 10/2003 | Graham et al. |
| 2003/0219552 | A1 | 11/2003 | Graham et al. |
| 2003/0235677 | A1 * | 12/2003 | Hanschen et al. ........... 428/156 |
| 2004/0001931 | A1 | 1/2004 | Izzi et al. |

FOREIGN PATENT DOCUMENTS

| | | |
|---|---|---|
| GB | 2 165 164 A | 4/1986 |
| JP | 6-33022 | 2/1994 |
| JP | 6-116538 | 4/1994 |
| JP | 9-86034 | 3/1997 |
| JP | 2000-334877 | 12/2000 |
| WO | WO 93/05123 | 3/1993 |
| WO | WO 99/55537 | 11/1999 |
| WO | WO 99/58620 | 11/1999 |
| WO | WO 99/65999 | 12/1999 |
| WO | WO 00/00563 | 1/2000 |
| WO | WO 00/73082 A1 | 12/2000 |
| WO | WO 00/73083 A1 | 12/2000 |
| WO | WO 01/15820 A1 | 3/2001 |
| WO | WO 01/58697 A2 | 8/2001 |
| WO | WO 01/58698 A2 | 8/2001 |
| WO | WO 01/70897 A2 | 9/2001 |
| WO | WO 01/96099 A1 | 12/2001 |
| WO | WO 02/074877 A2 | 9/2002 |

* cited by examiner

COMPLEX MICROSTRUCTURE FILM

FIELD OF THE INVENTION

The present invention relates to printable adhesive articles.

BACKGROUND OF THE INVENTION

The present invention is related to printable adhesive articles. The present invention is especially useful for linerless adhesive tapes and labels. Images and printed matter including indicia, bar codes, symbols and graphics are common. Images and data that warn, educate, entertain, advertise or otherwise inform, etc. are applied on a variety of interior and exterior surfaces.

Techniques that may be used to print images and printed matter include thermal mass transfer printing (also known simply as thermal transfer printing), dot-matrix printing, laser printing, electrophotography (including photocopying) and inkjet printing. Inkjet can include printing by drop-on-demand inkjet or continuous inkjet techniques. Drop on demand techniques include piezo inkjet and thermal inkjet printing which differ in how the ink drops are created.

Inkjet inks can be organic-solvent based, aqueous (water-based) or solid (phase-change) inkjet inks. Solid inkjet inks have a solid wax or resin binder component. The ink is melted. The molten ink is then printed by ink-jet.

The components of an inkjet system used for making graphics can be grouped into three major categories: the computer, software, and printer category, the ink category and the category of receptor medium.

The computer, software, and printer will control the size, number and placement of the ink drops and will transport the receptor medium through the printer. The ink will contain the colorant. The receptor medium provides a repository to accept and hold the ink. The quality of the inkjet image is a function of the total system.

The composition and interaction between the ink and receptor medium is most important in an inkjet system. With printers now exceeding 2400×2400 dpi resolution, inkjet drop size is smaller than in the past. A typical drop size for this dpi precision, is less than about 10 picoliters. Some printer makers are striving for even smaller drop sizes, while other printer makers are content with the larger drop sizes for large format graphics.

Containers, packages, cartons, and cases, (generally referred to as "boxes") for storing and shipping products typically use box sealing tape, such as an adhesive tape, to secure the flaps or covers so that the box will not accidentally open during normal shipment, handling, and storage. Box sealing tape maintains the integrity of a box throughout its entire distribution cycle. Box sealing tape can be used on other parts of boxes and on other types of article. A typical box sealing tape comprises a plastic film backing with a printable surface and a pressure-sensitive adhesive layer. This tape can be printed and applied to a box to seal the box. It can also be printed, cut into a label and applied onto a box or article. These tapes can be made in roll or pad form, and can have information printed or otherwise applied to, or contained within or on, the tape.

These boxes generally display information about the contents. This information most commonly located on the box might include lot numbers, date codes, product identification information, and bar codes. The information can be placed onto the box using a number of methods. These include pre-printing the box when it is manufactured, or printing this information onto the box at the point of use. Other approaches include the use of labels, typically white paper with pre-printed information either applied manually, or with an online automatic label applicator.

A recent trend in conveying information related to the product is the requirement to have the information specific for each box. For example, each box can carry specific information about its contents and the final destination of the product, including lot numbers, serial numbers, and customer order numbers. The information is typically provided on tape or labels that are customized and printed on demand, generally at the point of application onto the box.

One system for printing information involves thermal transfer ink printing onto tape or labels using an ink ribbon and a special heat transfer print head. A computer controls the print head by providing input to the head, which heats discrete locations on the ink ribbon. The ink ribbon directly contacts the label so that when a discrete area is heated, the ink melts and is transferred to the label. Another approach using this system is to use labels that change color when heat is applied (direct thermal labels). In another system, variable information is directly printed onto a box or label by an inkjet printer including a print head. A computer can control the ink pattern sprayed onto the box or label.

Both thermal transfer and inkjet systems produce sharp images. With both ink-jet and thermal transfer systems, the print quality depends on the surface on which the ink is applied. It appears that the best system for printing variable information is one in which the ink and the print substrate can be properly matched to produce a repeatable quality image, especially bar codes, that must be read by an electronic scanner with a high degree of reliability.

Regardless of the specific printing technique, the printing apparatus includes a handling system for guiding a continuous web of tape to the print head away from the print head following printing for subsequent placement on the article of interest (for example, a box). To this end, the web of tape is normally provided in a rolled form ("tape supply roll"), such that the printing device includes a support that rotatably maintains the tape supply roll. When the tape roll is linerless, the adhesive of the tape is in intimate contact with the printable surface of the next wrap of tape in the roll.

Examples of microstructured ink receptor media can be found in WO 99/55537, WO 00/73083, WO 00/73082, WO 01/58697 and WO 01/58698.

SUMMARY OF THE INVENTION

Using a microporous or microstructured ink receptor adhesive article without a liner has created special problems. Generally, the adhesive layer tends to flow into the microstructured elements of the microstructure surface or the porous surface of the microporous substrate. Under certain conditions of time, pressure and temperature, the adhesive layer may become transferred or bonded to the surface below. Therefore, in stacks of linerless labels or in a roll of tape, the adhesive can no longer be separated from the microstructured surface directly below it. This results in either failure between the adhesive and its backing or complete failure to remove the top layer of the adhesive article.

The present invention is directed to an adhesive article having a receptor medium comprising a microstructured surface that can be stacked into a pad or wound into a roll of tape and maintain the removability of the top adhesive article or the leading edge of the tape. Specifically, the present invention is directed to an article comprising at least one major surface comprising a microstructured surface, the microstructured surface comprising microstructured elements, the microstructured elements comprising walls and at least one wall has variable height with a maximum height and a minimum height along the wall length.

The present invention is additionally directed to a multilayer article comprising a first layer and a seconf layer. The first layer comprises a first backing, the backing comprising a first major surface and a second major surface, wherein the first major surface comprises a microstructured surface comprising depressed microstructured elements, wherein the microstructured elements have walls separating the microstructured elements and at least one wall has variable height along the wall and a maximum height and a minimum height along the wall; and a first adhesive layer on the second major surface of the first backing. The second layer comprises a second backing, the backing comprising a first major surface and a second major surface, wherein the first major surface comprises a microstructured surface comprising depressed microstructured elements, wherein the microstructured elements have walls separating the microstructured elements and at least one wall has variable height along the wall and a maximum height and a minimum height along the wall; and a second adhesive layer on the second major surface of the second backing. In the multilayer article, the first adhesive layer is in contact with the first major surface of the second backing.

The present invention is further directed to a method of manufacturing a film comprising extruding a resin between a nip roll and a cast roll under pressure, wherein the temperature of the cast roll during the method ($T_{Process}$) is lower than the temperature equired for full replication of the tool ($T_{FR}$). Generally $T_{process}$ is at least 5° C. lower than $T_{fr}$.

DETAILED DESCRIPTION OF THE INVENTION

For the purpose of the present invention, the following terms shall be defined:

"Microstructured element" means a recognizable geometric shape that either protrudes or is depressed.

"Microstructured surface" is a surface comprising microstructured elements.

Figure 1:
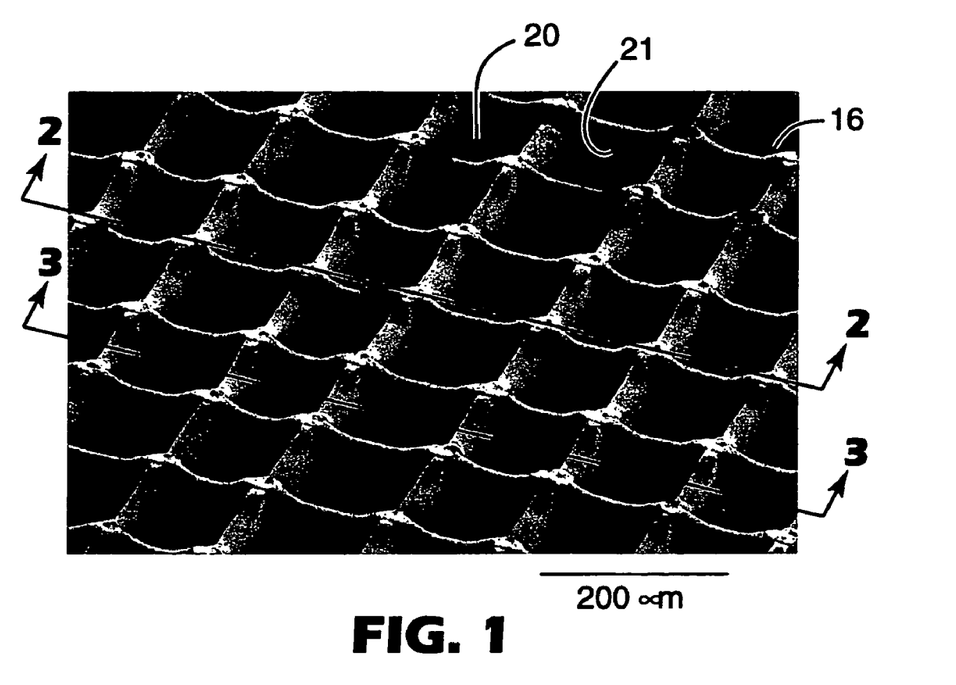
FIG. 1 is a scanning electron microscopy image of an embodiment of the present invention.

FIG. 1 is a scanning electron microscopy of an embodiment of the present invention. The optical image illustrates microstructured elements 20 and walls 21 enclosing the microstractured elements.

Figure 2:
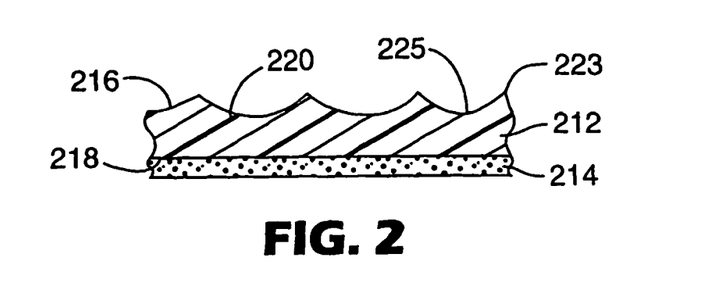
FIG. 2 is a transverse cross-sectional view of the embodiment illustrated in FIG. 1 along line 2-2.

FIG. 2 illustrates an adhesive article embodying features of the invention. FIG. 2 shows a longitudinal cross sectional view of an embodiment as shown in FIG. 1 along the line 2-2. The adhesive article comprises a microstructured backing 212 and an adhesive layer 214. The microstructured backing 212 comprises a first major surface 216 and a second major surface 218. An adhesive layer 214 is in contact with the second major surface 218. The adhesive layer 214 may be a continuous layer or a discontinuous layer (e.g. stripes or dots of adhesive.)

Figure 3:
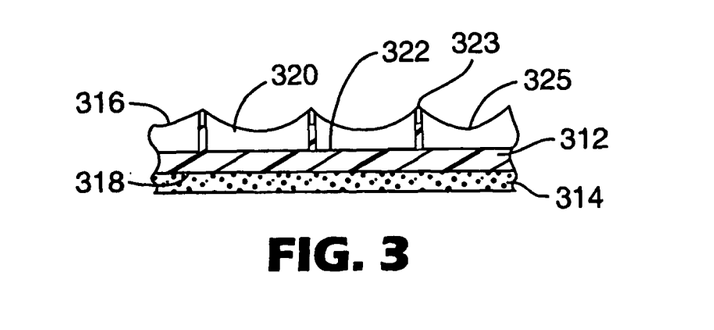
FIG. 3 is a transverse cross-sectional view of the embodiment illustrated in FIG. 1 along line 3-3.

FIG. 3 illustrates a longitudinal cross sectional view of an embodiment as shown in FIG. 1 along the line 3-3. In the embodiment illustrated in FIG. 3, the first major surface 316 of the microstructured backing defines microstructured elements, in this case depressed microstructured elements 320, within the first major surface 316. The microstructured elements 320 have a surface 322. The microstructured element surface 322 may be smooth or textured (e.g. ridges defined within the microstructured element surface 322 (not shown)). The ridges may have any pattern, such as straight lines or cross-cut lines.

The microstructured elements 20 are enclosed by walls 21. The walls 21 illustrated in FIG. 1 have a variable height. The walls 21 have a height (i.e. height above the surface of the microstructured element 22) of from about 5 to about 200 micrometers, for example between about 5 and about 100 micrometers. In certain embodiments, the difference in height between the shortest height on the wall (minimum height) and the tallest (maximum height) is between about 1 and about 50 micrometers, for example between about 1 and about 30 micrometers, and may exist at any point along the wall. In certain embodiments, the difference between the minimum and the maximum height is between about 5 and about 20 micrometers. For example, FIG. 3 illustrates in some embodiments the walls 21 have intersection points 323 (i.e. where one wall meets another wall), and the maximum height is at the intersection point. In other embodiments, the walls have a point 325 along the walls between any two intersection points, and the minimum height is at the point 325. In other embodiments, the minimum height is zero (0) and a portion of the wall may be level with the microstructured element surface 322.

The walls generally have a thickness of between about 1 to about 50 micrometers, for example between about 1 and about 30 micrometers. In certain examples, the walls have a thickness of between about 5 and about 30 micrometers.

In general, the choice of geometrical configuration of the microstructured element has sufficient capacity to control placement of an individual drop of ink. In some embodiments, the geometrical configuration is chosen such that the microstructured element pitch (that is, center to center distance between microstructured elements) is between about 1 and about 1000 micrometers, for example between about 10 and about 500 micrometers. In specific embodiments, the pitch is between about 50 and about 400 micrometers.

The microstructured elements may have any structure. For example, the structure for the microstructured element can range from the extreme of cubic elements with parallel vertical, planar walls, to the extreme of hemispherical elements, with any possible solid geometrical configuration of walls in between the two extremes. Specific examples include cube elements, cylindrical elements, conical elements with angular, planar walls, truncated pyramid elements with angular, planar walls, honeycomb elements and cube corner shaped elements. Other useful microstructured elements are described in PCT publications WO 00/73082 and WO 00/73083.

The pattern of the topography can be regular, random, or a combination of the two. "Regular" means that the pattern is planned and reproducible. "Random" means one or more features of the microstructured elements are varied in a non-regular manner. Examples of features that are varied include for example, microstructured element pitch, peak-to valley distance, depth, height, wall angle, edge radius, and the like. Combination patterns may for example comprise patterns that are random over an area having a minimum radius of ten microstructured element widths from any point, but these random patterns can be reproduced over larger distances within the overall pattern. The terms "Regular", "Random" and "Combination" are used herein to describe the pattern imparted to the length of web by one repeat distance of the tool having a microstructured pattern thereon. For example, when the tool is a cylindrical roll, one repeat distance corresponds to one revolution of the roll. In another embodiment, the tool may be a plate and the repeat distance would be a plate and the repeat distance would correspond to one or both dimensions of the plate.

The volume of a microstructured element can range from about 1 to about 20,000 pL, for example from about 1 to about 10,000 pL. Certain embodiments have a volume of from about 3 to about 10,000 pL, for example from about 30 to about 10,000 pL, such as from about 300 to about 10,000 pL. The volumes of the microstructured elements may decrease as printing technology leads to smaller ink drop size.

For applications in which desktop inkjet printers (typical drop size of 3-20 pL) will be used to generate the image, microstructured element volumes generally range from about 300 to about 8000 pL. For applications in which large format desktop inkjet printers (typical drop size of 10-200 pL will be used to generate the image, microstructured element volumes range from about 1,000 to about 10,000 pL.

Another way to characterize the structure of the microstructured elements 20 is to describe the microstructured elements in terms of aspect ratios. An "aspect ratio" is the ratio of the height of a microstructured element to the width of a microstructured element. Useful aspect ratios for a depressed element range from about 0.01 to about 2, for example from about 0.05 to about 1, and in specific embodiments from about 0.05 to about 0.8. Useful aspect ratios for a protruding element range from about 0.01 to about 15, for example from about 0.05 to about 10, and in specific embodiments from about 0.05 to about 8.

The overall height of the microstructured elements depends on the shape, aspect ratio, and desired volume of the microstructured element. The height of a microstructured element can range from about 5 to about 200 micrometers. In some embodiments, the height ranges from about 20 to about 100 micrometers, for example about 30 to about 90 micrometers.

Microstructured element pitch is in the range of from 1 to about 1000 micrometers. Certain embodiments have a microstructured element pitch of from about 10 to about 500 micrometers, for example from about 50 to about 400 micrometers. The microstructured element pitch may be uniform, but it is not always necessary or desirable for the pitch to be uniform. It is recognized that in some embodiments of the invention, it may not be necessary, or desirable, that uniform element pitch be observed between microstructured elements, nor that all features be identical. Thus, an assortment of different types of features, for example, microstructured elements with, perhaps, an assortment of pitches may comprise the microstructured surface. The average peak to valley distances of individual elements is from about 1 to about 200 micrometers.

Figure 4:
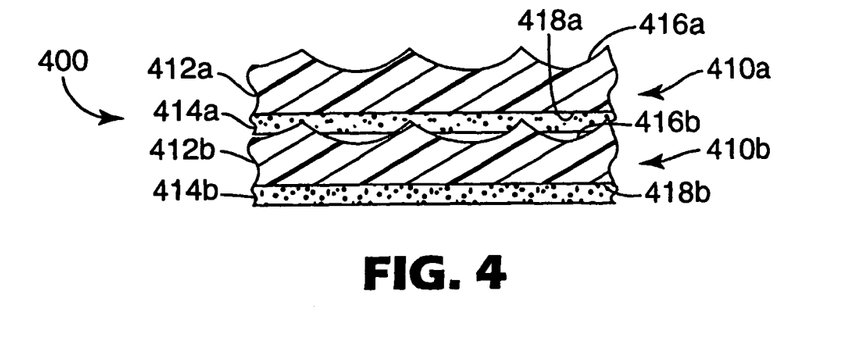
FIG. 4 is a cross-sectional view of an embodiment of the present invention including a multilayer structure.

FIG. 4 shows an embodiment of the present invention in a multilayer structure 400. FIG. 4 illustrates two layers of a multilayer structure with first adhesive article 410a and second adhesive article 410b. The first adhesive article 410a comprises a microstructured backing 412a and an adhesive layer 414a. The microstructured backing 412a comprises a first major surface 416a and a second major surface 418a. The second adhesive article 410b comprises a microstructured backing 412b and an adhesive layer 414b. The microstructured backing 412b comprises a first major surface 416b and a second major surface 418b. The first adhesive layer 414a is in direct contact with the first major surface 416b of the second microstructured backing 412b. Therefore, in order to remove the first adhesive article 410a from the second adhesive article 410b, the first adhesive layer 414a releases from the first major surface of 416b of the second microstructured backing 412b.

Figure 5:
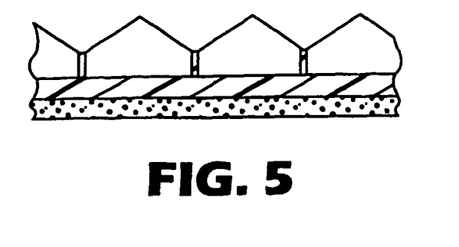
FIGS. 5-6 are cross sectional views along the wall of additional embodiments of the present invention.
Figure 6:
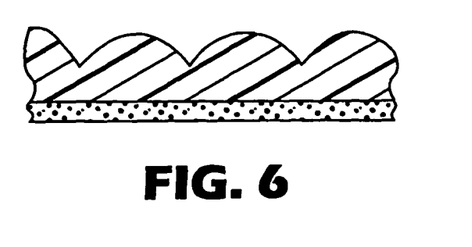

FIGS. 5 and 6 illustrate different embodiments of a cross section of an article of the invention.

Microstructured Backing

The microstructured backing typically comprises a polymer. The backing can be a solid film. The backing can be transparent, translucent, or opaque, depending on desired usage. The backing can be clear or tinted, depending on desired usage. The backing can be optically transmissive, optically reflective, or optically retroreflective, depending on desired usage.

Nonlimiting examples of polymeric films useful as backing in the present invention include thermoplastics such as polyolefins (e.g. polypropylene, polyethylene), poly(vinyl chloride), copolymers of olefins (e.g. copolymers of propylene), copolymers of ethylene with vinyl acetate or vinyl alcohol, fluorinated thermoplastics such as copolymers and terpolymers of hexafluoropropylene and surface modified versions thereof, poly(ethylene terephthalate) and copolymers thereof, polyurethanes, polyimides, acrylics, and filled versions of the above using fillers such as silicates, silica, aluminates, feldspar, talc, calcium carbonate, titanium dioxide, and the like. Also useful in the application are coextruded films and laminated films made from the materials listed above. More specifically, the microstructured backing is formed from polyvinyl chloride, polyethylene, polypropylene, and copolymers thereof.

Properties of the backing used in the present invention can be augmented with optional coatings that improve control of the ink receptivity of the microstructured surface of the backing. Any number of coatings are known to those skilled in the art. It is possible to employ any of these coatings in combination with the microstructured surface of the present invention.

One can employ a fluid management system having a variety of surfactants or polymers can be chosen to provide particularly suitable surfaces for the particular fluid components of the pigmented inkjet inks. Surfactants can be cationic, anionic, nonionic, or zwitterionic. Many types of surfactant are widely available to one skilled in the art. Accordingly, any surfactant or combination of surfactants or polymer(s) that will render a polymer surface hydrophilic can be employed.

These surfactants can be coated or otherwise applied onto the microstructured element surface of the microstructured elements in the microstructured surface. Various types of surfactants have been used in the coating systems. These may include but are not limited to fluorochemical, silicon and hydrocarbon-based ones wherein the said surfactants may be cationic, anionic or nonionic. Furthermore, the nonionic surfactant may be used either as it is or in combination with another surfactant, such as an anionic surfactant in an organic solvent or in a mixture of water and organic solvent, the said organic solvents being selected from the group of alcohol, amide, ketone and the like.

Various types of non-ionic surfactants can be used, including but not limited to: fluorocarbons, block copolymers of ethylene and propylene oxide to an ethylene glycol base, polyoxyethylene sorbitan fatty acid esters, octylphenoxy polyethoxy ethanol, tetramethyl decynediol, silicon surfactants and the like known to those skilled in the art.

A release coating (low adhesion backsize) may additionally be applied to the microstructured surface. The release coating may be a continuous layer or a discontinuous layer (e.g. stripes and dots.) The release coating may be applied to the entire microstructured surface, including the microstructured elements, or only to certain areas of the microstructured surface. For example, in embodiments comprising depressed microstructured elements, the release coating may be applied only to the surface and not within the microstructured elements. In some embodiments, a release material can be blended with the material used to make the microstructured backing and incorporated into the backing.

Other coating materials may be used which are intended to improve the appearance or durability of the printed image on the microstructured surface. For example, an ink-jet receptor coating may be used. The inkjet receptor coating may comprise one or more layers. Useful ink receptive coatings are hydrophilic and aqueous ink sorptive. Such coatings include, but are not limited to, polyvinyl pyrrolidone, homopolymers and copolymers and substituted derivatives thereof, polyethyleneimine and derivatives, vinyl acetate copolymers, for example, copolymers of vinyl pyrrolidone and vinyl acetate, copolymers of vinyl acetate and acrylic acid, and the like, and hydrolyzed derivatives thereof; polyvinyl alcohol, acrylic acid homopolymers and copolymers; co-polyesters; acrylamide homopolymers and copolymers; cellulosic polymers; styrene copolymers with allyl alcohol, acrylic acid, and/or maleic acid or esters thereof, alkylene oxide polymers plus copolymers; gelatins and modified gelatins; polysaccharides, and the like. If the targeted printer prints aqueous dye inks, then a suitable mordant may be coated onto the microstructured surface in order to demobilize or "fix" the dyes. Mordants that may be used generally consist of, but are not limited to, those found in patents such as U.S. Pat. Nos. 4,500,631; 5,342,688; 5,354,813; 5,589,269; and 5,712,027. One specific example of an inkjet receptor coating is a solution containing polyvinyl polymers and copolymers containing vinyl pyridine as described in copending U.S. provisional application No. 60/357863 filed Feb. 19, 2002. Various blends of these materials with other coating materials, for example a blend of a release agent and an inkjet receptor, listed herein are also within the scope of the invention.

Additionally, directly affecting the substrate by means generally known in the art may be employed in the context of this invention. For example, flame treated surfaces, corona treated surfaces (air and nitrogen), or surface dehydrochlorinated poly(vinyl chloride) could be made into a microstructured backing as a printable substrate.

Adhesive

The microstructured backing may be formed into an adhesive article by the addition of an adhesive layer on the second major surface of the microstructured backing. The adhesive may be a pressure sensitive adhesive. Any suitable pressure sensitive adhesive composition can be used for this invention. The pressure-sensitive adhesives can be any conventional pressure-sensitive adhesive that adheres to both the microstructured backing and to the surface receiving the adhesive article. The pressure sensitive adhesive component can be any material that has pressure sensitive adhesive properties including the following: (1) tack, (2) adherence to a substrate with no more than finger pressure, and (3) sufficient ability to hold onto an adherend. Furthermore, the pressure sensitive adhesive component can be a single pressure sensitive adhesive or the pressure sensitive adhesive can be a combination of two or more pressure sensitive adhesives.

Pressure sensitive adhesives useful in the present invention include, for example, those based on natural rubbers, synthetic rubbers, styrene block copolymers, polyvinyl ethers, poly (meth)acrylates (including both acrylates and methacrylates), polyolefins, and silicones.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, and curing agents.

In a specific embodiment, the pressure sensitive adhesive is based on styrene-isoprene-styrene block copolymer.

In one embodiment, the adhesive is a low-flow adhesive. A low-flow adhesive is taught in U.S. Application Ser. No. 60/391,497, filed Jun. 25, 2002.

One specific embodiment of the invention has a fiber reinforced pressure sensitive adhesive as described in co-pending U.S. application Ser. No. 09/764,478, filed Jan. 17, 2001 and the continuation in part U.S. application Ser. No. 10/180,784, filed Jun. 25, 2002. In such an embodiment, any suitable pressure sensitive adhesive composition can be used as a matrix of adhesive for the fiber reinforced adhesive. The pressure sensitive adhesive may be a low-flow adhesive, but some pressure sensitive adhesives that are not low-flow adhesives may still be adequate as a matrix for the fiber reinforced pressure sensitive adhesive. The pressure sensitive adhesive is then reinforced with a fibrous reinforcing material. Various reinforcing materials may be used to practice the present invention. In specific embodiments, the reinforcing material is a polymer. In certain embodiments, the reinforcing material is elastomeric. Examples of the reinforcing material include an olefin polymer, such as ultra low density polyethylene.

Additional layers of adhesive may be included on the adhesive layer opposite the microstructured backing. For example, a second adhesive layer may be coated on the low flow adhesive layer. The second adhesive layer may or may not be a low flow adhesive. For example, an a second adhesive layer that is not a low flow adhesive may be beneficial in a thin layer to maximize the tack of the adhesive article.

Method of Manufacturing the Tape

The tape comprises a microstructured film and an adhesive layer. The microstructured film has a first major surface comprising a microstructured surface and a second major surface. The microstructured surface can be made in a number of ways, such as using casting, coating, or compressing techniques. For example, microstructuring the first major surface of the backing can be achieved by at least any of (1) casting a molten thermoplastic using a tool having a microstructured pattern, (2) coating of a fluid onto a tool having a microstructured pattern, solidifying the fluid, and removing the resulting film, or (3) passing a thermoplastic film through a nip roll to compress against a tool having a microstructured pattern. The tool can be formed using any of a number of techniques known to those skilled in the art, selected depending in part upon the tool material and features of the desired topography. Illustrative techniques include etching (for example, via chemical etching, mechanical etching, or other ablative means such as laser ablation or reactive ion etching, etc.), photolithography, stereolithography, micromachining, knurling (for example, cutting knurling or acid enhanced knurling), scoring or cutting, etc. Alternative methods of forming the microstructured surface include thermoplastic extrusion, curable fluid coating methods, and embossing thermoplastic layers which can also be cured.

The compressing method uses a hot press familiar to those skilled in the art of compression molding. The pressure exerted in the press typically ranges from about 48 kPa to about 2400 kPa. The temperature of the press at the mold surface typically ranges from about 50° C. to about 200° C., for example from about 110° C. to about 170° C.

The duration time in the press typically ranges from about one second to about 5 minutes. The pressure, temperature and duration time used depend primarily on the particular material being micro-embossed, and the type of microstructured element being generated as is known to those skilled in the art.

The process conditions should be sufficient to cause the material to flow and generally take the shape of the surface of the tool being used. Any generally available commercial hot press may be used.

The extrusion method involves passing an extruded material or preformed substrate through a nip created by a chilled roll and a casting roll engraved with an inverse pattern of the desired microstructure. Or, an input film is fed into an extrusion coater or extruder. A polymeric layer is hot-melt coated (extruded) onto the input film. The polymeric layer is then formed into a microstructured surface.

Single screw or twin screw extruders can be used. Conditions are chosen to meet the general requirements understood to one skilled in the art. For example, the temperature profile in the extruder can range from 100° C. to 250° C. depending on the melt characteristics of the resin. The temperature at the die ranges from 150° C. to 250° C. depending on the characteristics of the resin. The pressure exerted in the nip can range from about 140 to about 1380 kPa and preferably from about 350 to about 550 kPa. The temperature of the nip roll can range from about 5° C. to about 150° C., for example from about 10° C. to about 100° C., and the temperature of the cast roll can range from about 25° C. to about 100° C., for example about 40° C. to about 60° C. Generally the temperature of the cast roll during the process ($T_{Process}$) is lower than the temperature required for full replication of the tool ($T_{FR}$). $T_{FR}$ is the minimum temperature the cast roll should be set at to ensure complete replication of the pattern in the tool to the resin film. $T_{FR}$ is dependent on many factors, including the resin used, the line speed and the pressure in the nip. One of skill in the art can determine $T_{FR}$ for any given process conditions. $T_{Process}$ is generally at least 5° C. lower than $T_{FR}$. The speed of movement through the nip typically ranges from about 0.25 to about 500 meters/min, but generally will move as fast as conditions allow.

Calendering may be accomplished in a continuous process using a nip, as is known in the film handling arts. In the present invention, a web having a suitable surface, and having sufficient thickness to receive the desired microstructure pattern is passed through a nip formed by two cylindrical rolls, one of which has an inverse image to the desired embossing engraved into its surface. The surface layer contacts the engraved roll at the nip. The web is generally heated to temperatures of from 100° C. up to 540° C. with, for example, radiant heat sources (for example, heat lamps, infrared heaters, etc.) and/or by use of heated rolls at the nip. A combination of heat and pressure at the nip (typically, 100 to 500 lb/inch (1.8 kg/centimeter to 9 kg/centimeter)) is generally used in the practice of the present invention.

The second major surface of the microstructured backing is adhesive coated with an adhesive composition as described above. This may be accomplished using any coating technique known in the art.

The resulting adhesive article may include a release liner on the adhesive layer (not shown), though a release liner is not necessary. Release liners are known and commercially available from a number of sources. Examples of release liners include silicone coated kraft paper, silicone coated polyethylene coated paper, silicone coated or non-coated polymeric materials such as polyethylene or polypropylene. The aforementioned base materials may also be coated with polymeric release agents such as silicone urea, fluorinated polymers, urethanes, and long chain alkyl acrylates.

Printed Article

The adhesive article described is desirable to print. The microstructured elements contain any ink receptive coating and any ink applied to the microstructured surface, resulting in a controlled image.

Method of Printing

The adhesive article may be printed by any method known in the art. Specifically, the present adhesive article may be placed into an ink-jet printer and printed at high speeds (i.e. speeds in excess of 5 cm/second) while maintaining a clean image.

The following examples further disclose embodiments of the invention.

EXAMPLES

Test Methods

Microstructured Film Images and Wall Height Differential

Images of the microstructure film providing three dimensional relief were obtained using Scanning Electron Microscopy at a magnification of from about 40 to about 250×. The height differential of the walls forming the recesses was obtained by scanning white light interferometry. For Examples 1 (Comparative) and 2 a Wyko interferometer was employed and for Examples 3 (Comparative) and 4-10 a Zygo interferometer was used.

Peel Adhesion Strength (Initial)

A sample of the extruded microstructured film measuring 2 inches wide by 5 inches long (5.08 by 12.7 cm) was attached to a steel plate (2×5×1/16 inches (5.08×12.7×0.16 cm)) using double stick tape such that the microstructured surface was exposed. This and samples of 3M Scotch® Box Sealing Tape No. 311 (a general purpose box sealing tape having a 0.00095 inch (24 micrometer) thick pressure sensitive acrylic adhesive on a 0.0011 inch (28 micrometer) thick biaxially oriented polypropylene backing, available from 3M Company, St. Paul, Minn.) were conditioned for 24 hours at 77° F. (25° C.) and 50% relative humidity. Next, a piece of the tape measuring about 7 inches long by 1 inch wide was placed lengthwise with the adhesive side down on the microstructured surface of the film such that about 2 inches (5.08 cm) of the tape extended past the edge of the film substrate. This portion was doubled back onto itself to provide a one inch (2.54 cm) tab. A 4.5 pound (2.04 kg) rubber roller was mechanically passed over the tape once in each direction (forward and back) at a rate of 12 inches/minute (30.5 cm/minute). This assembly was then used to measure 90° angle peel adhesion strength at room temperature using an SINTECH 6 (available from MTS Systems Corporation, Research Triangle Park, N.C.) equipped with a 25 pound load cell at a jaw separation rate of 50 inches/minute (127 cm/minute). The reported value was an average of 3 samples. This procedure was also employed using 3M Scotch® Superior Performance Box Sealing Tape No. 375 (a superior performance packaging tape having a 0.0011 inch (28 micrometer) thick pressure sensitive hot melt adhesive on a 0.002 inch (51 micrometer) thick biaxially oriented polypropylene backing, available from 3M Company, St. Paul, Minn.) in place of the 311 tape.

Peel Adhesion Strength (Aged)

Peel adhesion strengths were measured on assemblies of steel plate/microstructured film/adhesive tape which were prepared as described above in "Peel Adhesion Strength (Initial)" and aged as follows. The assemblies were aged at 150° F. (66° C.) for 24 hours then equilibrated for 24 hours at 77° F. (25° C.) and 50% relative humidity before testing for peel adhesion strength as previously described.

Example 1 (Comparative)

A microstructured film was prepared which exhibited an essentially uniform height for both the walls and intersection points of the walls running perpendicular to each other. More specifically, an 83:17 (w:w) mixture of a clear polypropylene resin (FINA 3376, a polypropylene homopolymer resin containing calcium stearate having a melt flow rate (per ASTM D1238, 230C/2.16 kg load) of between about 2.5 and about 3.1 g/10 minutes, a Hunter Color "b" of 2.0 or less, and xylene solubles of between about 3.5 and 4.5%, obtained from ATOFINA Petrochemical Company, Dallas, Tex.) and a white pigmented polypropylene resin (a 1:1 blend by weight of titanium dioxide and PP4792 E1, a polypropylene resin having a typical melt flow rate of 2.7 g/10 minutes (230° C./2.16 kg), available from ExxonMobil Chemical, Houston, Tex.) were extruded into between two heated nip rollers located in close proximity to the die using a Killion single screw extruder (available from Davis Standard Killion, Pawcatuck, Conn.). The extruder had a diameter of 3.18 centimeters (cm) (1.25 inches), a length/diameter ratio of 30:1, and five heated zones which were set as follows: Zone 1, 124° C. (255° F.); Zone 2, 177° C. (350° F.); Zone 3, 235° C. (455° F.); Zone 4, 243° C. (470° F.); and Zone 5, 249° C. (480° F.). The die temperature was set at 249° C. (480° F.). The molten resin exited the die and was drawn between two nip rollers closed under pressure. The upper nip roll was a rubber coated roll and the lower nip roll was a metal tool roll having a microstructured pattern engraved on its surface. The nip rolls both had a diameter of approximately 30.5 cm (12 inches) and were hollow to permit heating or chilling of the rolls by passing a fluid through their interiors. The setpoint of the upper roll was 38° C. (100° F.) and the setpoint of the lower roll was 110° C. (230° F.). The web speed was between approximately 3.0 and 3.7 meters/minute (9.8 to 12.1 feet/minute).

The metal tool roll was engraved with three sets of grooves. There were two sets of parallel grooves, which were perpendicular to each other and are referred to hereinafter as the major grooves. These two perpendicular sets of helical grooves ran at an angle of approximately 45° to the roll axis, and had a depth of approximately 75 micrometers (microns, or μm), a width of approximately 18 μm at the bottom and 38 μm at the top, and were spaced approximately 125 μm apart. The third set of grooves, hereinafter referred to as the minor grooves, ran at an angle of approximately 90° to the roll axis (i.e., parallel to the web direction) and had a depth of between about 8 and about 10 micrometers, a width of approximately 8 micrometers at the bottom and approximately 11 micrometers at the top, and were spaced approximately 35 μm apart.

The microstructured surface of the tool roll embossed the extruded polypropylene resin to provide a polypropylene film having a first major surface with a microstructured pattern thereon, and a second major surface. The embossed film thus obtained, having a total thickness of about 0.0056 inches (142 micrometers), cooled prior to reaching a windup roll. The embossed pattern on the film comprised wells or recesses separated by walls. The recesses were rhomboidal in shape with a nominal depth of 75 μm, and the walls lay at 45° to the machine direction (web direction) of the microstructured film. In addition, the bottom of the recesses contained ridges which ran at an angle of 45° to the direction of the walls of the recesses (that is, they ran parallel to the web direction) and which had a nominal height of between 8 and 10 μm, a width at the top of about 8 micrometers and at the bottom of about 11 micrometers, and which were spaced approximately 35 μm apart. Inspection with a Wyco Interferrometer microscope (Model RST, obtained from Veeco Metrology Group, Tucson, Ariz.) revealed essentially uniform wall heights along their lengths including the intersection points where the walls that ran perpendicular to each other crossed. The ridge heights also appeared to be uniform.

Example 2

Example 1 was repeated with the following modification. The metal tool roll had a temperature setpoint of 99° C. (210° F.). The microstructured film thus obtained, having a total thickness of 0.0050 inches (127 micrometers), inspected by interferrometer. It was observed that the walls possessed a saddle-like shape with respect to their height. There was a minimum in the wall height at a position between the intersection points and a maximum in the region of the intersection points, with the height differential being approximately 14 μm. The ridges in the bottom of the recesses exhibited a uniform height.

Examples 3 (Comparative) and 4-7

Microstructured films were prepared which exhibited varying degrees of height differential between the intersection points of the walls running perpendicular to each other and a point along the wall length between the intersection points. These were evaluated for their release characteristics from adhesive tapes both initially and after aging at elevated temperature and for their wall height differential. More specifically, clear polypropylene resin (Homopolymer 4018 Injection Molding Resin having a melt flow rate of 13.5 g/10 minutes (230° C./2.16 kg), available from BP Amoco Polymers, Naperville, Ill.) was extruded into between two heated nip rollers located in close proximity to the exit die using a Davis Standard single screw extruder (available from Davis Standard Killion, Pawcatuck, Conn.). The extruder had a diameter of 6.35 cm (2.50 inches), a length/diameter ratio of 38/1, and six heated zones which were set as shown in Table 1 below. Also shown in Table 1 are the actual feedblock and die temperatures.

The molten resin exited the die and was drawn between two nip rollers closed under pressure. The upper nip roll was a rubber coated roll and the lower nip roll was a metal tool roll having a microstructured pattern engraved on its surface. This pattern was comprised of major grooves and minor grooves like that described in Example 1 with the following modification. The set of minor grooves had a depth of between about 4 and about 5 micrometers, a width of approximately 8 μm at the bottom and approximately 11 μm at the top, and were spaced approximately 35 μm apart. The nip rolls both had a diameter of approximately 45.7 cm (18 inches) and were hollow to permit heating or chilling of the rolls by passing a fluid through their interiors. The temperatures of the upper rubber roll and lower metal, as well as the web speeds, for each example are given in Table 1 below.

The total film thicknesses for Examples 1-10 are shown in Table 3 below. The resulting microstructured films were evaluated for their wall height differential and their release characteristics from an adhesive tape both initially and after aging at elevated temperature as described in the test methods above. The results are shown in Table 4 below.

TABLE 1

| Parameters | Example | | | | |
|---|---|---|---|---|---|
| | 3 (Comparative) | 4 | 5 | 6 | 7 |
| Feedblock °C. (° F.) | 238 (460) | 238 (460) | 238 (460) | 238 (460) | 238 (460) |
| Zone 1 °C. (° F.) | 108 (226) | 108 (226) | 120 (248) | 147 (297) | 147 (297) |
| Zone 2 °C. (° F.) | 182 (360) | 182 (360) | 182 (360) | 183 (361) | 182 (360) |
| Zone 3 °C. (° F.) | 204 (400) | 204 (400) | 204 (400) | 204 (400) | 204 (400) |
| Zone 4 °C. (° F.) | 216 (420) | 216 (420) | 216 (420) | 216 (420) | 215 (419) |
| Zone 5 °C. (° F.) | 216 (420) | 216 (420) | 216 (421) | 216 (420) | 216 (420) |
| Zone 6 °C. (° F.) | 216 (420) | 216 (420) | 216 (420) | 216 (420) | 214 (418) |
| Die °C. (° F.) | 238 (460) | 238 (460) | 238 (460) | 238 (460) | 238 (460) |
| Rubber Roll °C. (° F.) | 21 (70) | 22 (71) | 16 (61) | 16 (61) | 16 (61) |
| Tool Roll °C. (° F.) | 77 (170) | 77 (170) | 71 (160) | 63 (145) | 57 (135) |
| Web Speed meters/minute (feet/minute) | 5.36 (17.6) | 9.14 (30.0) | 13.7 (45.0) | 18.3 (60.0) | 22.9 (75.0) |

Examples 8-10

Microstructured films were prepared which exhibited varying degrees of height differential between the intersection points of the walls running perpendicular to each other and a point along the wall length between the intersection points. These were evaluated for their release characteristics from adhesive tapes both initially and after aging at elevated temperature and for their wall height differential. More specifically, an 83:17 (w:w) mixture of a clear polypropylene resin (Homopolymer 4018 Injection Molding Resin, available from BP Amoco Polymers, Naperville, Ill.) and a white pigmented polypropylene resin like that used in Example 1 was extruded into a microstructured film using the procedure described for Examples 3 (Comparative) and 4-7 above. The zone, feedblock, die, rubber roll, and metal roll temperatures, as well as web speeds, are shown in Table 2 below.

The resulting microstructured films thus obtained, having a total thickness of about 0.0055 inches (140 micrometers), were evaluated their wall height differential and their release characteristics from an adhesive tape both initially and after aging at elevated temperature as described in the test methods above. The results are shown in Table 4 below.

TABLE 2

| Parameters | Example | | |
|---|---|---|---|
| | 8 | 9 | 10 |
| Feedblock °C. (° F.) | 238 (460) | 227 (440) | 227 (440) |
| Zone 1 °C. (° F.) | 153 (308) | 158 (316) | 158 (316) |
| Zone 2 °C. (° F.) | 182 (360) | 193 (380) | 193 (380) |
| Zone 3 °C. (° F.) | 205 (401) | 204 (400) | 204 (400) |
| Zone 4 °C. (° F.) | 216 (421) | 216 (420) | 216 (420) |
| Zone 5 °C. (° F.) | 216 (421) | 227 (440) | 227 (440) |
| Zone 6 °C. (° F.) | 216 (420) | 227 (440) | 227 (440) |
| Die °C. (° F.) | 238 (460) | 227 (440) | 227 (440) |
| Rubber Roll °C. (° F.) | 54 (130) | 54 (130) | 54 (130) |
| Tool Roll °C. (° F.) | 57 (135) | 57 (135) | 57 135 |
| Web Speed meters/minute (feet/minute) | 22.9 (75.0) | 22.9 (75.0) | 22.9 (75.0) |

TABLE 3

| Example | 1 | 2 | 3 | 4 | 5 | 6 | 7 | 8 | 9 | 10 |
|---|---|---|---|---|---|---|---|---|---|---|
| Thickness (inches/1000) | 5.6 | 5.0 | 8.5 | 5.9 | 5.9 | 6.3 | 5.6 | 5.5 | 5.5 | 5.5 |
| Thickness (μm) | 142 | 127 | 216 | 150 | 150 | 160 | 142 | 140 | 140 | 140 |

TABLE 4

| Example | Height Differential (micrometers) | Tape 311 Initial (oz./inch) (N/cm) | Tape 311 Aged (oz./inch) (N/cm) | Tape 375 Initial (oz./inch) (N/cm) | Tape 375 Aged (oz./inch) (N/cm) |
|---|---|---|---|---|---|
| 3 (Comparative) | 0 | 9.0 (0.975) | 16.7 (1.81) | 23.7 (2.57) | 17.0 (1.84) |
| 4 | 1 | 9.7 (1.05) | 17.0 (1.84) | 27.3 (2.96) | 17.7 (1.92) |
| 5 | 3 | 9.0 (0.975) | 15.3 (1.66) | 25.7 (2.78) | 17.3 (1.87) |

TABLE 4-continued

| Example | Height Differential (micrometers) | Tape 311 Initial (oz./inch) (N/cm) | Tape 311 Aged (oz./inch) (N/cm) | Tape 375 Initial (oz./inch) (N/cm) | Tape 375 Aged (oz./inch) (N/cm) |
|---|---|---|---|---|---|
| 6 | 3 | 8.7 (0.942) | 14.3 (1.55) | 28.7 (3.11) | 16.0 (1.73) |
| 7 | 10 | 7.3 (0.791) | 16.0 (1.73) | 27.3 (2.96) | 15.0 (1.62) |
| 8 | 14 | 5.3 (0.574) | 11.7 (1.27) | 24.0 (2.60) | 13.3 (1.44) |
| 9 | 13 | 5.0 (0.541) | 11.0 (1.19) | 22.3 (2.42) | 12.7 (1.38) |
| 10 | 13 | 6.3 (0.682) | 13.0 (1.41) | 22.7 (2.46) | 13.3 (1.44) |

Various modifications and alterations of the present invention will become apparent to those skilled in the art without departing from the spirit and scope of the invention.

The invention claimed is:

1. A multi-layer article comprising:
a first layer comprising:
a first backing, the backing comprising a first major surface and a second major surface, wherein the first major surface comprises a microstructured surface comprising depressed microstructured elements, wherein the microstructured elements have walls separating the microstructured elements and at least one wall has variable height along the wall and a maximum height and a minimum height along the wall, and wherein said microstructured surface comprises polyolefin microstructured elements, wherein each microstructured element shares one or more walls with each adjacent microstructured element;
a first adhesive layer on the second major surface of the first backing; and
a second layer comprising:
a second backing, the backing comprising a first major surface and a second major surface, wherein the first major surface comprises a microstructured surface comprising depressed microstructured elements, wherein the microstructured elements have walls separating the microstructured elements and at least one wall has variable height along the wall and a maximum height and a minimum height along the wall, and wherein said microstructured surface comprises polyolefin microstructured elements; and
a second adhesive layer on the second major surface of the second backing, wherein the first adhesive layer is in contact with the first major surface of the second backing, and wherein the first adhesive layer does not contact the first major surface of the second backing in locations along the walls where the wall has the minimum height.

2. The article of claim 1, wherein the maximum height is between about 5 and about 200 micrometers.

3. The article of claim 1, wherein the minimum height is between about 0 and about 200 micrometers.

4. The article of claim 1, wherein the difference between the maximum height and the minimum height is between about 1 and about 50 micrometers.

5. The article of claim 1, wherein the difference between the maximum height and the minimum height is between about 1 and about 30 micrometers.

6. The article of claim 1, wherein the difference between the maximum height and the minimum height is between about 5 and about 20 micrometers.

* * * * *

UNITED STATES PATENT AND TRADEMARK OFFICE
CERTIFICATE OF CORRECTION

PATENT NO. : 7,678,443 B2
APPLICATION NO. : 10/483873
DATED : March 16, 2010
INVENTOR(S) : Mark F Schulz It is certified that error appears in the above-identified patent and that said Letters Patent is hereby corrected as shown below:

Column 1
Line 27, Delete "ink-jet." and insert -- inkjet. --, therefor.

Column 2
Line 25, Delete "ink-jet" and insert -- inkjet --, therefor.

Column 3
Line 5, Delete "a seconf" and insert -- a second --, therefor.
Line 30, Delete "equired" and insert -- required --, therefor.
Line 31, Delete "$T_{process}$" and insert -- $T_{Process}$ --, therefor.
Line 31, Delete "$T_{fr}$." and insert -- $T_{FR}$. --, therefor.
Line 57, Delete "microstractured" and insert -- microstructured --, therefor.

Column 7
Line 16, Delete "ink-jet" and insert -- inkjet --, therefor.
Line 29, Delete "plus" and insert -- and --, therefor.

Column 8
Line 41, Delete "an a" and insert -- a --, therefor.

Column 12
Line 14, Delete "Interferrometer" and insert -- Interferometer --, therefor.
Line 27, Delete "interferrometer." and insert -- Interferometer. --, therefor.

Signed and Sealed this

Eleventh Day of May, 2010

David J. Kappos
*Director of the United States Patent and Trademark Office*